(12) United States Patent
DeShazer et al.

(10) Patent No.: US 7,615,735 B2
(45) Date of Patent: Nov. 10, 2009

(54) RANDOM NUMBER GENERATION USING A SCATTERING WAVEGUIDE

(75) Inventors: David J. DeShazer, Bay City, MI (US); Terry V. Clapp, Hertfordshire (GB)

(73) Assignee: Dow Corning, Inc., Auburn, MI (US)

(*) Notice: Subject to any disclaimer, the term of this patent is extended or adjusted under 35 U.S.C. 154(b) by 134 days.

(21) Appl. No.: 11/816,851

(22) PCT Filed: Feb. 22, 2006

(86) PCT No.: PCT/US2006/006029

§ 371 (c)(1),
(2), (4) Date: Aug. 22, 2007

(87) PCT Pub. No.: WO2006/101645

PCT Pub. Date: Sep. 28, 2006

(65) Prior Publication Data

US 2008/0149866 A1 Jun. 26, 2008

(51) Int. Cl.
*G01J 1/04* (2006.01)
*G01J 1/42* (2006.01)
*G01J 5/08* (2006.01)

(52) U.S. Cl. .............. 250/227.11; 385/147; 380/44; 380/54; 380/263

(58) Field of Classification Search ............ 250/227.11; 385/147; 380/44, 54, 263
See application file for complete search history.

(56) References Cited

U.S. PATENT DOCUMENTS

| | | | |
|---|---|---|---|
| 4,961,618 A * | 10/1990 | Jordan et al. | 385/130 |
| 6,249,009 B1 | 6/2001 | Kim et al. | |
| 6,263,146 B1 * | 7/2001 | Umeno et al. | 385/147 |
| 6,609,139 B1 | 8/2003 | Dultz et al. | |
| 6,831,980 B1 | 12/2004 | Borza et al. | |
| 2001/0046293 A1 * | 11/2001 | Gleeson | 380/44 |
| 2003/0223729 A1 * | 12/2003 | Pavlath et al. | 385/147 |
| 2004/0032954 A1 * | 2/2004 | Bonfrate et al. | 380/263 |

OTHER PUBLICATIONS

PCT/US2006/006029 International Search Report (Jul. 6, 2006).

* cited by examiner

*Primary Examiner*—Seung C Sohn
(74) *Attorney, Agent, or Firm*—Williams, Morgan & Amerson

(57) ABSTRACT

The present invention provides a method and apparatus for random number generation using a scattering waveguide. The apparatus includes a light source for providing coherent light and a scattering waveguide for receiving the coherent light and providing scattered light. The relative position of the light source and the scattering waveguide are variable. The apparatus also includes a detector for forming at least one random number based on the scattered light.

29 Claims, 8 Drawing Sheets

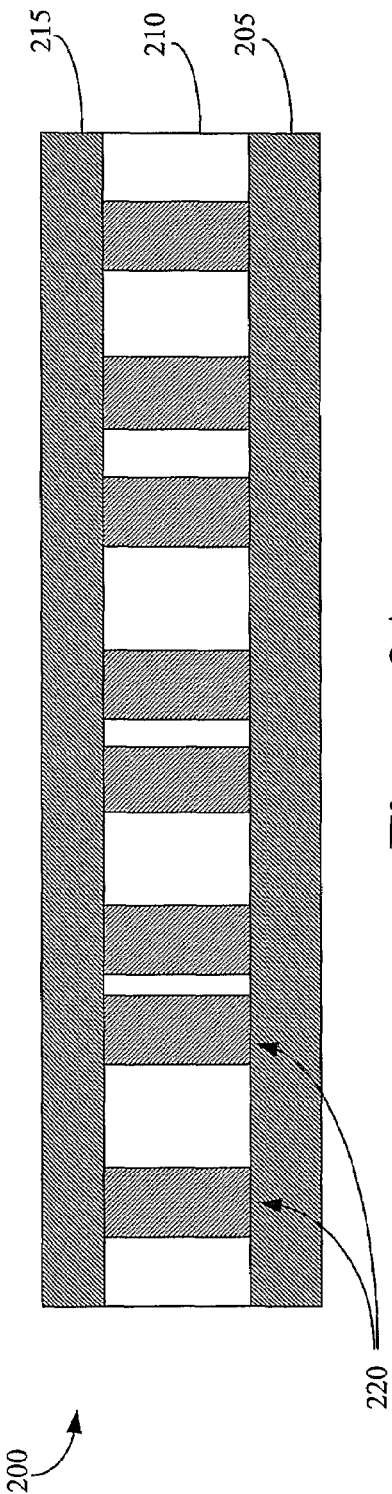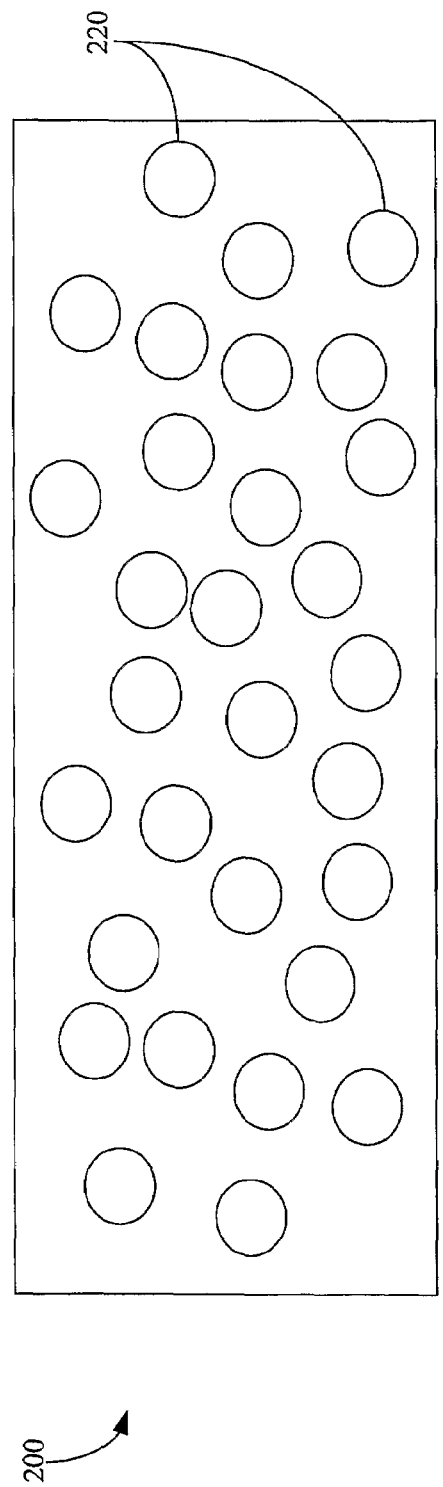
Figure 2A
Figure 2B

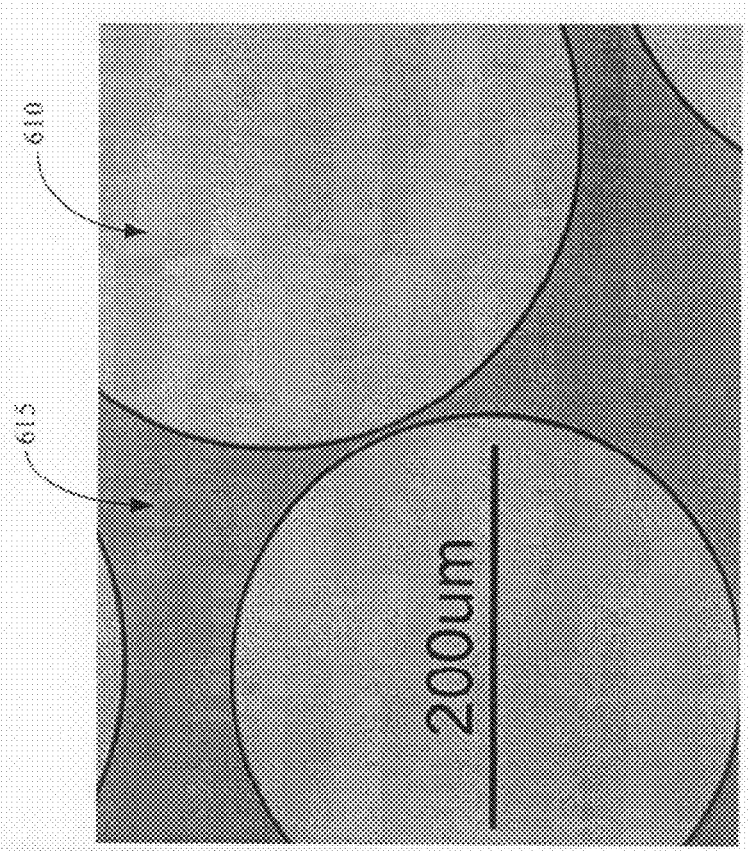
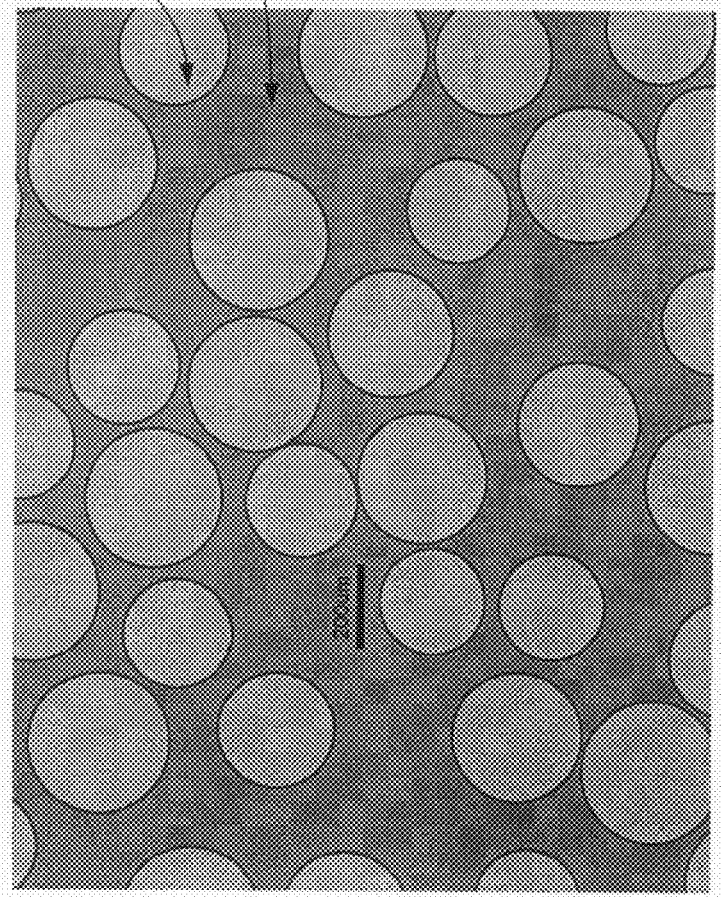
Figure 6A
Figure 6B

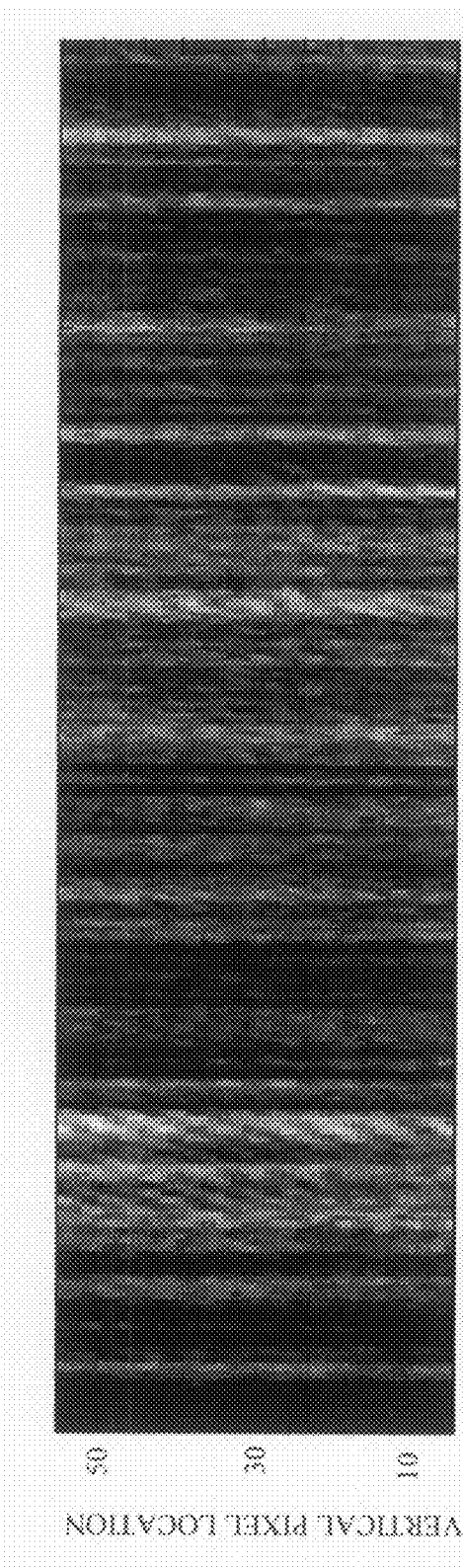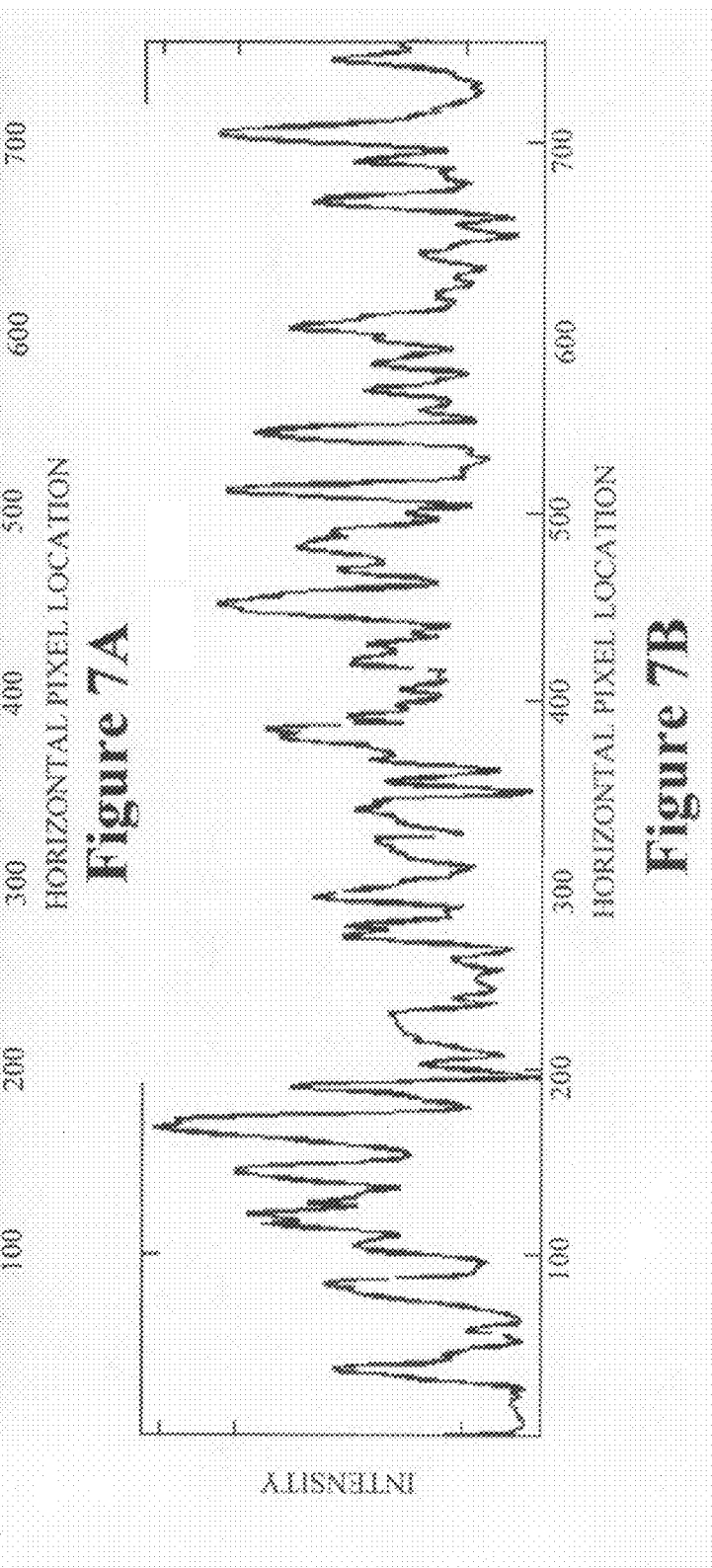
Figure 7A
Figure 7B

RANDOM NUMBER GENERATION USING A SCATTERING WAVEGUIDE

BACKGROUND OF THE INVENTION

1. Field of the Invention

This invention relates generally to data encryption, and, more particularly, to generating a random number using a scattering waveguide.

2. Description of the Related Art

Modern communication networks, including the Internet, the World Wide Web, and various intranets, including secure government and corporate intranets, may transmit large amounts of data to virtually any device capable of communicating with the network. Government agencies, industrial and commercial concerns, and private citizens have come to rely on these networks to transmit data in a secure and efficient fashion. For example, private citizens may order products and/or services from various commercial concerns by providing personal information and credit card information over the Internet. Both the private citizens and the commercial concerns rely upon the network to transmit this information in a secure manner so that the information cannot be stolen by a third party. For another example, government agencies may transmit confidential documents using an interagency intranet. The government agencies therefore rely upon these communication networks to preserve the confidentiality of the documents. Consequently, information transmitted over various communication networks is typically encrypted.

Data may be encrypted using encryption keys. For example, in public key encryption, a user has a private encryption key that should be known only to the user and a public key that is available to anyone. Data sent by the user may be encrypted using the public encryption key and a computational function, such as a hashing function. The encrypted data may only be decrypted by someone with access to the private key. As long as the user keeps the private key secret, data encrypted using the public key is prohibitively difficult for any other person or entity to decrypt. However, the value of a single private key may be determined comparatively easily. For example, the value of the private key may be determined by examining a post-it note including the private key, by directly or remotely accessing private keys stored on a computer from an unsecured location, and the like.

Users or organizations that transmit secure information on a regular basis, or that transmit highly sensitive information, may therefore employ a random encryption key generator to provide new encryption keys on a regular basis. The computational functions used to generate encryption keys are typically concise and are often well-known to persons of ordinary skill in the art. Thus, a sophisticated adversary may predict future encryption keys if a limited number of keys have been discovered through successful attacks on encrypted data or using inside information. These types of attacks are commonly referred to as known-key attacks. In some cases, a single compromised encryption key may be sufficient to undermine the security of an encryption key generator.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, an apparatus is provided for random number generation using a scattering waveguide. The apparatus includes a light source for providing coherent light and a scattering waveguide for receiving the coherent light and providing scattered light. The relative position of the light source and the scattering waveguide are variable. The apparatus also includes a detector for forming at least one random number based on the scattered light.

In one embodiment of the present invention, a method is provided for random number generation using a scattering waveguide. The method includes selecting a relative position of a light source and a scattering waveguide, providing coherent light to the scattering waveguide using the light source, receiving light scattered by the scattering waveguide in the selected position, and forming a random number based on the scattered light.

BRIEF DESCRIPTION OF THE DRAWINGS

The invention may be understood by reference to the following description taken in conjunction with the accompanying drawings, in which like reference numerals identify like elements, and in which:

FIGS. 2A and 2B conceptually illustrate a side view and a top-down view, respectively, of a first exemplary embodiment of a scattering waveguide, in accordance with the present invention;

FIGS. 6A and 6B conceptually illustrate one exemplary embodiment of a symmetric, polymer, slab waveguide that is constructed on a single-crystal silicon substrate, in accordance with the present invention;

FIGS. 7A and 7B shows an exemplary CCD image of scattered light and a vertically averaged plot of the intensity of the scattered light, respectively.

Figure 1:
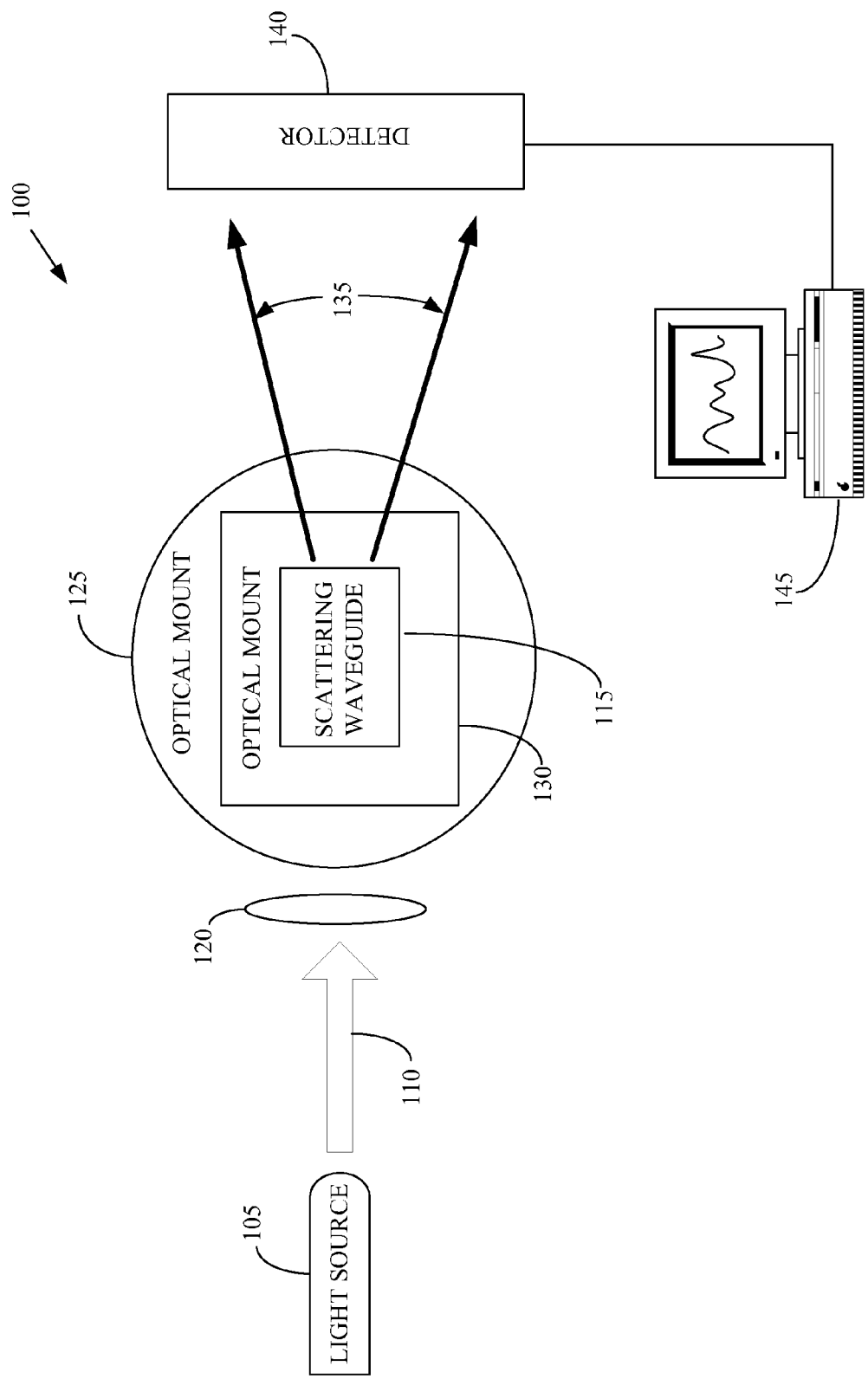
FIG. 1 conceptually illustrates a system for generating random numbers, such as random encryption keys, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to FIG. 1, a system 100 for generating random numbers, such as random encryption keys, is shown. The system includes a light source 105. In the illustrated embodiment, the light source 105 is a laser. For example, the light source 105 may be a conventional desktop laser, such as a 633 nm HeNe laser. However, persons of ordinary skill in the art should appreciate that the present invention is not limited to conventional desktop lasers. In alternative embodiments, any desirable type of laser may be used. For example, the light source 105 may be a laser having any desirable characteristic wavelength that is formed using any desirable gas active medium. For another example, which may be used when the system 100 is implemented as part of a semiconductor device, the light source 105 may be a semiconductor diode laser. The system 100 may also include other elements such as mirrors, lenses, filters, gratings, and the like that are not shown in FIG. 1.

The light source 105 provides coherent light, as indicated by the arrow 110, to a scattering waveguide 115. Persons of ordinary skill in the art should appreciate that the coherent light 110 provided by the light source 105 may not be perfectly coherent over an infinite distance. Instead, in accordance with common usage in the art, the term "coherent" refers to light that is coherent over length scales that are on the same order as, or greater than, one or more characteristic length scales associated with the system 100. For example, the coherent light 110 may be coherent over a length scale that is at least as large as a length scale associated with the scattering waveguide 115, such as a height, width, and/or length of the scattering waveguide 115. A conventional 633 nm HeNe laser may have a coherence length of approximately 1 meter and a semiconductor diode laser may have a coherent length of approximately 1 cm. In the illustrated embodiment, the coherent light 110 is provided to the scattering waveguide 115 via an end-face coupling 120. For example, the end-face coupling 120 may include one or more lenses that shape the coherent light 110 such that the beam will have an appropriate spot size (e.g. based on a thickness of the scattering waveguide 115) and/or numerical aperture (e.g. determined by index and index contrast of the scattering waveguide 115). In one embodiment, the end-face coupling 120 may increase the amount of light that will be launched in the guiding regime of the scattering waveguide 115.

The position of the scattering waveguide 115 relative to the light source 105 may be varied. In the illustrated embodiment, the scattering waveguide 115 is mounted on a first kinetic optical mount 125 that allows the linear position of the scattering waveguide 115 to be varied. For example, the scattering waveguide 115 may be moved in a direction perpendicular to the propagation direction of the coherent light 110. The illustrated embodiment of the scattering waveguide 115 is also mounted on a second kinetic optical mount 130 that allows the angular orientation of the scattering waveguide 115 to be varied. For example, the scattering waveguide may be rotated about an axis that is perpendicular to the plane of FIG. 1. Together, the first and second kinetic optical mounts 125, 130 may have six degrees of freedom of motion, which may allow complete control of the linear and/or angular orientation of the scattering waveguide 115. As will be discussed in detail below, changing the position of the scattering waveguide 115 allows a plurality of random encryption keys to be generated by the system 100.

The scattering waveguide 115 includes a plurality of scattering sites (not shown in FIG. 1) that may be distributed randomly throughout a portion of the scattering waveguide 115. Accordingly, the coherent light 110 may be scattered in the scattering waveguide 115 to form scattered light, as indicated by the arrows 135. At least a portion of the scattered light 135 may shine upon a detector 140. In various alternative embodiments, the detector 140 may be a CCD camera, a photodiode array, and the like. As will be discussed in detail below, the detector 140 may provide a signal indicative of a plurality of intensities of the scattered light 135 to an image processor 145, which may generate a random number based upon the signal indicative of the plurality of intensities of the scattered light 135. The random number may be used as a random encryption key.

FIGS. 2A and 2B conceptually illustrate a side view and a top-down view, respectively, of a first exemplary embodiment of a scattering waveguide 200. The first exemplary embodiment of the scattering waveguide 200 includes a first cladding layer 205, a first core layer 210, and a second cladding layer 215. However, persons of ordinary skill in the art should appreciate that the scattering waveguide 200 is not limited to these layers. In alternative embodiments, more or fewer layers may be included. For example, the first cladding layer 205 may be formed on a substrate (not shown). In one embodiment, the first and second cladding layers 205, 215 and the first core layer 210 are part of a single-mode planar waveguide formed of epoxy-functionalized siloxane resins. However, in alternative embodiments, any desirable material may be used to form the layers 205, 210, 215.

A plurality of scattering pillars 220 is formed in the first core layer 210. In the illustrated embodiment, the scattering pillars 220 are formed of the same material as is used to form the first and second cladding layers 205, 215. For example, the scattering pillars 220 may be formed of an epoxy-functionalized siloxane resin. The scattering pillars 220 and the first and second cladding layers 205, 215 have an index of refraction contrast with the material used to form the first core layer 210 of approximately 1.0%. However, in alternative embodiments, the scattering pillars 220 may be formed of any desirable material and may have any desirable index of refraction contrast. Persons of ordinary skill in the art should appreciate that the thicknesses of the layers 205, 210, 215 may be influenced by the selected contrast in the index of refraction.

Alternatively, the waveguide 200 may be constructed from optical materials that may allow the index of refraction and the contrast of index of refraction to be modified in a controlled fashion. This modification could be permanent or reversible. Routes to such a modification include, but are not restricted to thermal optic tuning, the electro optic effect, Kerr effect, physical stress or strain, or the absorption of additional chemical species by the waveguide material. For example, by adjusting the temperature of a thermally sensitive material the index of refraction would change. This change would affect the optical path length of the system, and the mean free path length between scattering events. This would effectively generate an entirely new and unique scattering waveguide 200 for a given stepping of temperature.

The scattering pillars 220 shown in FIG. 2B have a circular cross-section. In one embodiment, the diameter of the scattering pillars 220 may be approximately 200 microns. If the illustrated embodiment of the scattering waveguide 200 is used with a 633 nm HeNe laser, then the characteristic length scale of the scattering pillars 220 is larger than the wavelength of the coherent light. Accordingly, the coherent light is predominantly forward scattered, i.e. the scattering is predominantly Mie scattering. However, persons of ordinary skill in the art should appreciate that the present invention is not limited to scattering pillars 220 having a circular cross-section with a diameter of 200 microns. In alternative embodiments, the scattering pillars 220 may have any desirable cross-sectional shape and/or dimension. Moreover, the dimensions and/or the cross-sectional shapes of the scattering pillars 220 may be distributed over a range of values.

Figure 3:
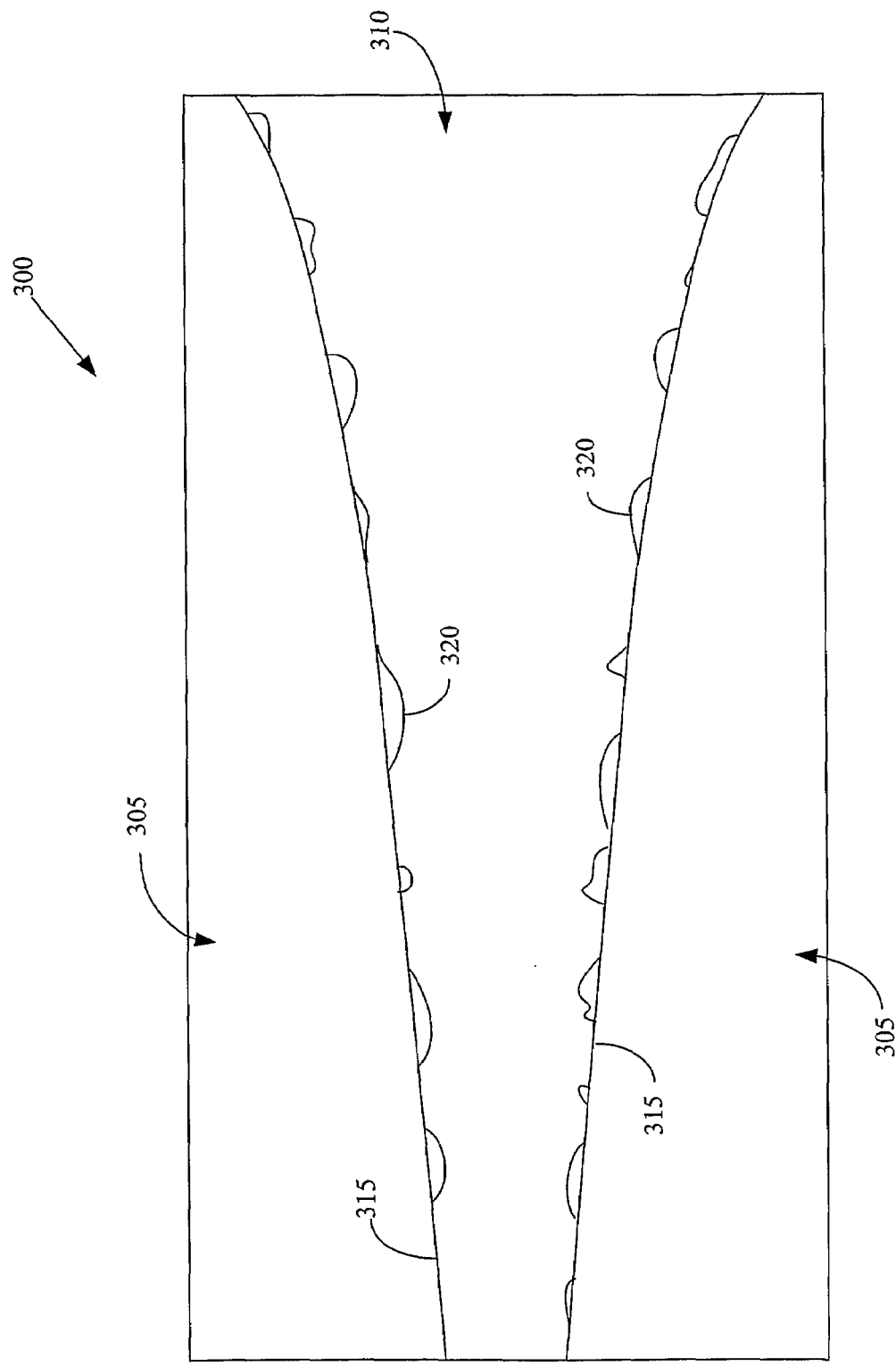
FIG. 3 conceptually illustrates a second exemplary embodiment of a scattering waveguide, in accordance with the present invention.

FIG. 3 conceptually illustrates a second exemplary embodiment of a scattering waveguide 300. In the illustrated embodiment, the scattering waveguide 300 includes waveguide regions 305 and a transmission region 310. The waveguide regions 305 and the transmission regions 310 may be formed of any desirable material. For example, the waveguide regions 305 and the transmission regions 310 may be formed of epoxy-functionalized siloxane resins. The index of refraction of the waveguide regions 305 and the transmission regions 310 differ by a selected amount. For example, a contrast in the index of refraction between the waveguide regions 305 and the transmission region 310 may be approximately 1.0%. However, persons of ordinary skill in the art should appreciate that the contrast in the index of refraction is a matter of design choice and may be varied for different embodiments.

Sidewalls 315 of the transmission region 310 are textured, as indicated by the features 320. Persons of ordinary skill in the art should appreciate that the texturing features 320 may have any desirable shape and/or distribution along the sidewalls 315. In one embodiment, a characteristic length scale of the texturing features 320 is selected to be larger than the wavelength of coherent light input to the scattering waveguide 300. In this embodiment, forward Mie scattering is dominant. The flaring of the side walls 315 may lead to modal bifurcations of the guided light with the texturing of the sidewalls 315 leading to additional complex structure in interference patterns formed when coherent light is transmitted and/or scattered by the scattering waveguide 300. Accordingly, the distribution of the scattered light may be less sensitive to the coherence length of the coherent light and therefore may be easier to model. However, the encryption keys formed using the scattering waveguide 300 may be somewhat less secure than encryption keys formed using the scattering waveguide 200 shown in FIGS. 2A-B.

Figure 4:
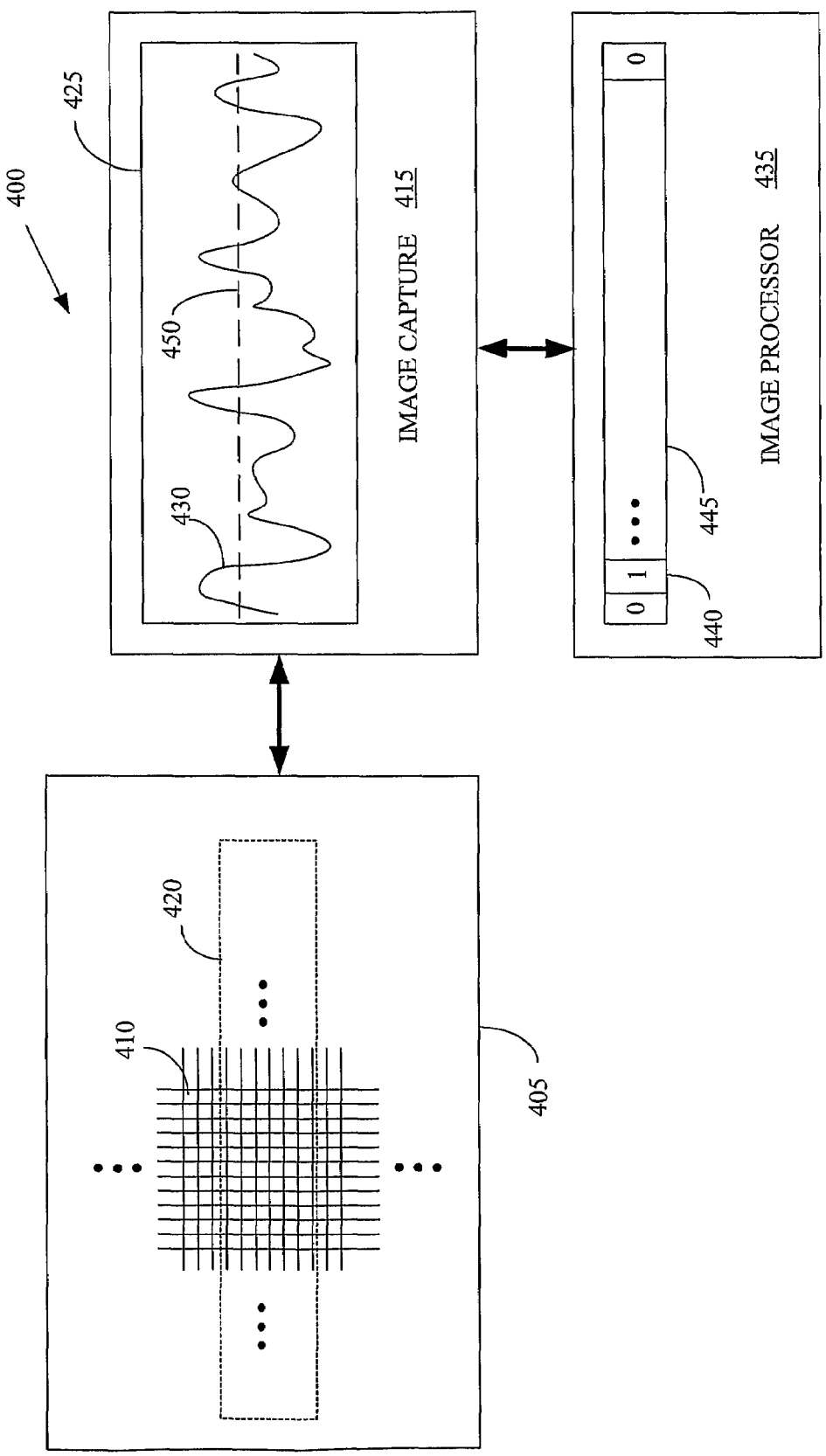
FIG. 4 conceptually illustrates one exemplary embodiment of an image capture and processing system, in accordance with the present invention.

FIG. 4 conceptually illustrates one exemplary embodiment of an image capture and processing system 400. In the illustrated embodiment, the image capture and processing system 400 includes a light detector 405. For example, the light detector 405 may be a CCD detector or camera, a photo diode array, and the like. The light detector 405 includes a surface having a plurality of light sensitive elements 410 distributed thereon. For example, the CCD detector may include a plurality of charge-coupled devices and a photodiode array may include a plurality of photosensitive diodes. The light sensitive elements 410 will be referred to herein as pixels 410. Each pixel 410 may provide a signal indicative of an intensity of light falling upon or proximate to the pixel 410.

One or more of the signals indicative of the intensity of light falling on (or near) one or more of the pixels 410 may be accessed by an image capture module 415. In one embodiment, the image capture module 415 accesses signals provided by a selected plurality of the pixels 410, as indicated by the dashed box 420. For example, if the light detector 405 is a CCD camera having dimensions of 720 pixels by 480 pixels, the image capture module 415 may access information from a subset 420 having dimensions of 512 pixels by 50 pixels. The image capture module 415 then forms a plot 425 of intensities 430 based upon the intensity information provided by the pixels 410 in the selected subset 420. For example, the intensity 430 may include 512 intensity values corresponding to 512 intensities averaged over the 50 pixels in each of the 512 rows of the subset 420.

In one embodiment, an image processor 435 forms a random number based upon the intensities 430. For example, the image processor 435 may associate the 512 intensities with 512 bytes 440 in a random number 445. Then, if the intensity associated with one of the bits 440 is below the threshold 450, the value of the bit 440 is set to "0". If the intensity associated with the bits 440 is above the threshold 450, the value of the bits 440 is set to "1". Persons of ordinary skill in the art should appreciate that the value of the threshold is a matter of design choice. Moreover, the present invention is not limited to determining the random number 445 using the threshold. In alternative embodiments, the random number 445 may be formed based upon the light detected by the detector 405 in any desirable manner. In the embodiment that includes 512 bytes, a random number space of more than $10^7$ numbers may be covered by a single device.

Although the detector 405, the image capture module 415, and the image processor 435 are depicted as separate elements in the image capture and processing system 400 shown in FIG. 4, persons of ordinary skill in the art should appreciate that the present invention is not so limited. In alternative embodiments, the detector 405, the image capture module 415, and the image processor 435 may be implemented in more or fewer distinct elements. Moreover, additional elements not shown in FIG. 4 to preserve the clarity of the figures may be included in the image capture and processing system 400. Persons of ordinary skill in the art should appreciate that, in alternative embodiments, portions of the detector 405, the image capture module 415, and the image processor 435 may be implemented and software, firmware, hardware, or any combination thereof. For example, the image capture and processing system 400 may include software implementing LabVIEW® image capture and processing algorithms.

Figure 5:
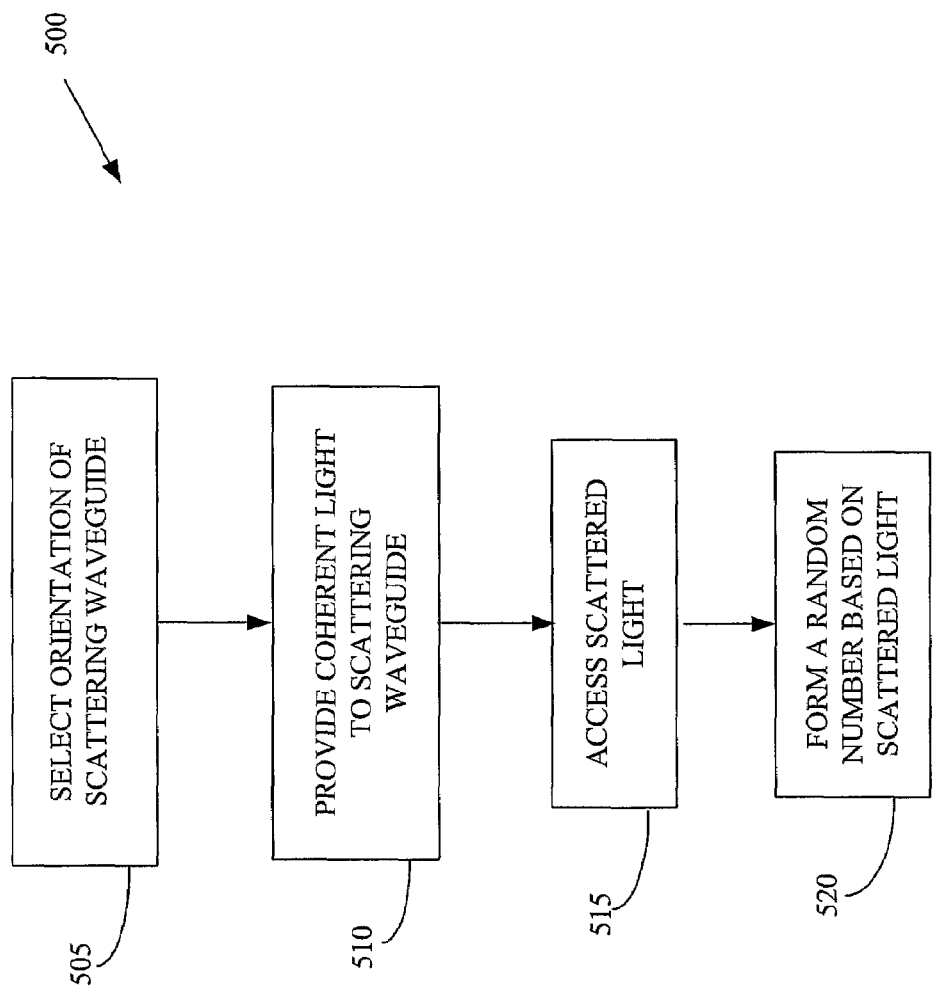
FIG. 5 conceptually illustrates one exemplary embodiment of a method of forming a random number based on scattered light, in accordance with the present invention.

FIG. 5 conceptually illustrates one exemplary embodiment of a method 500 of forming a random number based on scattered light. In the illustrated embodiment, an orientation of the scattering waveguide is selected (at 505). In one embodiment, kinetic optical mounts may be used to control the linear and/or angular orientation of the scattering waveguide. For example, if the scattering waveguide system uses 633 nm coherent light, random numbers may be produced by rotating the scattering waveguide by at least 10 micro-radians. Alternatively, the scattering waveguide may be displaced across the propagation direction of incident coherent light by approximately 5-10 microns.

Coherent light is then provided (at 510) to the scattering waveguide and light scattered by the scattering waveguide is accessed (at 515). For example, coherent light may be provided (at 510) by a laser and the scattered light may be accessed (at 515) using a detector such as a CCD detector or a photo diode array, as discussed in detail above. A random number, such as a random encryption key, is then formed (at 520) based on the accessed scattered light. Persons of ordinary skill in the art should appreciate that the random numbers formed (at 520) are considered "random" in a statistical sense, e.g. as determined by a cross-correlation measure or a relative entropy measure.

Random numbers, such as random encryption keys, formed using embodiments of the invention described above may have number of advantages over conventional techniques for forming random numbers. A single scattering waveguide may be used to define a large number of encryption keys by modifying the physical operation parameters of the random number generating system, such as an incident angle of the coherent light, a wavelength of the coherent light and the like. Systems for random number generation based on scattering waveguides are also inherently non-invertible due to the cascade nature of multiple scattering. Accordingly, it may be very difficult, or impossible, to reverse engineer the structure of the scattering waveguide, which may eliminate or reduce the danger of known-key attacks. Encryption keys generated in this fashion may also be suitable for symmetric-key encryption schemes used in current communications infrastructures. Moreover, large families of waveguides with approximately identical distributions of scattering sites, or single uniquely patterned devices, may be produced depending on the intended application.

Additional encryption key security may be provided by the sensitivity of multiple scattering to the structure of the scattering waveguide. For example, minimal physical tampering may significantly alter the performance of the device, effectively destroying the device and removing it from the communications network. Moreover, the random encryption keys may be generated on demand, thereby reducing or eliminating the need to store encryption keys in an active memory. The need to store information indicative of techniques of generating random encryption keys in the active memory may also be reduced. Accordingly, the likelihood that this information may be accessed by an adversary may be reduced.

FIGS. 6-8 conceptually illustrate operation of one exemplary embodiment of a random number generator including a slab waveguide having scattering pillars randomly distributed throughout a guiding layer. Persons of ordinary skill in the art should appreciate that the exemplary embodiment described with reference to FIGS. 6-8 is intended to the illustrative and not to limit the present invention.

FIGS. 6A and 6B conceptually illustrate one exemplary embodiment of a symmetric, polymer, slab waveguide that is constructed on a single-crystal silicon substrate. FIG. 6A shows a wide angle view of the waveguide and FIG. 6B shows a close-up view of the waveguide. The waveguide includes a plurality of randomly distributed scattering pillars 610 formed in a core layer 615. In the illustrated embodiment, the cladding layer (not shown) and core layer 615 of the waveguide are formed from Dow Corning photopatternable optical materials OE 5993 (low index) and OE 5993 (high index), respectively. Here, the low index formulation of OE 5993 includes an optional diluent. Each layer of the waveguide is successively spin coated, patterned (as required) using a Quintel Q-7000 mask aligner, and developed in a wet-etch process. The cladding layers, OE 5993 (low index), have an index of refraction n=1.51 and a thickness of approximately 20 μm. The core layer, OE 5993 (high index), has and index of refraction of n=1.53 and a thickness of 2-4 μm. The scattering pillars 610 in the core layer 615 are the same material as the cladding layers.

To form the scattering pillars 610 shown in FIGS. 6A-B, circular vias are patterned in a photosensitive polymer using a lithography mask custom fabricated per specifications by Benchmark Technologies and then etched from the core material. The vias are backfilled with the cladding material OE 6061 and the top clad layer is spin-coated, planarizing the entire structure.

The individual scattering waveguides are 1 cm×1 cm in size and each waveguide includes about 650 scattering pillars 610. The distribution and dimension of the 650 scattering pillars 610 patterned into the core layer 615 of the waveguide have normal random distribution within defined parameter values. The pillar diameters ranged from 250 to 350 μm. The centers of the pillar locations were restricted such that pillar edges would be a minimum of 5 μm from the edges of the neighboring pillars and the edge of the device. The individual 1 cm×1 cm scattering waveguides were diced using a diamond saw and polished to an optical finish with an 8° angle on the end-faces.

The waveguides were characterized using a helium-neon laser operating at 632.8 nm. The waveguide was mounted on opto-mechanical mounts, giving a combined six degrees of freedom, and the helium-neon laser was used to illuminate the sample. The collimated light from the laser was end-face-coupled into the waveguide using 10× microscope objective with a numerical aperture of 0.25, approximately matching the numerical aperture of the waveguide. The scattered light exiting the waveguide was imaged with a Watec WAT-202B CCD camera and Image Pro Plus 4.5.1 software.

FIG. 7A shows an exemplary CCD image 700 of the scattered light and FIG. 7B shows a vertically averaged plot 710 of the intensity of the scatter light, which was determined using the CCD image 700. In the illustrated embodiment, the vertical axis in FIG. 7A corresponds to the vertical pixel location on the CCD and the horizontal axis corresponds to the horizontal pixel location on the CCD. Lighter pixels indicate higher intensity of scattered light and the darker pixels indicate a relatively lower intensity of scattered light. The vertical axis in FIG. 7B corresponds to the intensity of the light calling on a particular pixel band in the horizontal axis corresponds to the horizontal pixel location. The intensity is measured in arbitrary units in FIG. 7B. The vertical averaging serves to aid in removing some pixel level noise. This distribution shown in FIG. 7b is determined uniquely by the structure of the scattering waveguide and experimental parameters, such as alignment with the laser beam.

Encryption keys were generated by processing the captured images of scattered light, such as the images shown in FIG. 7A-B, using custom code written using MATLAB 7.1. In order to demonstrate encryption key generation, the raw CCD image of the scattered light is imported into MATLAB as a bitmap. The image is filtered, as will be described below, and a string of random numbers with an approximately Gaussian distribution is extracted, forming the encryption key, which is converted to binary. A simple text-line user interface is used to enter the message to be encrypted, which is also converted to binary. For the purposes of demonstration, the message was encrypted by performing a simple, bit-wise XOR operation with the encryption key. An identical encryption key generated under the same operational parameters is used to decrypt the message.

Figure 8B:
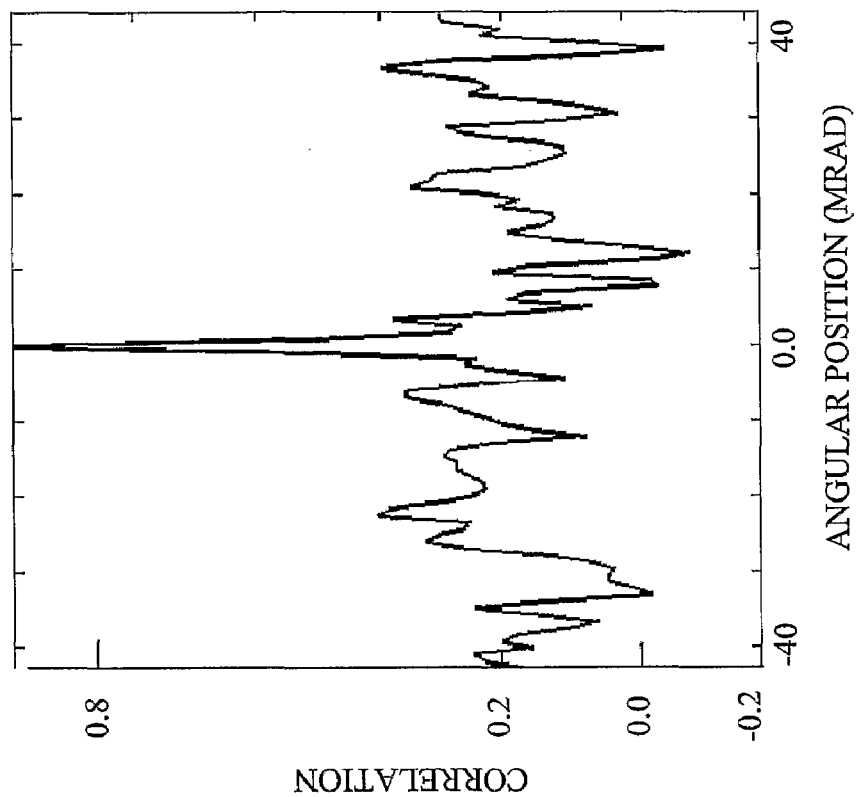
FIGS. 8A and 8B show cross-correlation coefficients as a function of the linear position and angular position, respectively.
Figure 8A:
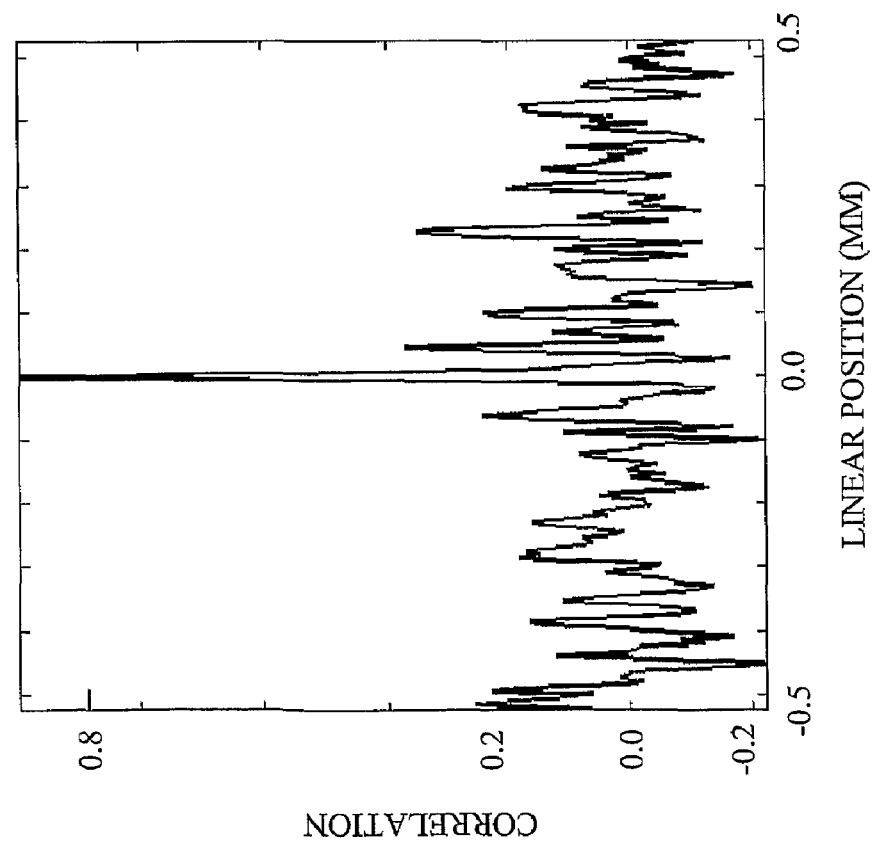

FIGS. 8A and 8B show cross-correlation coefficients as a function of the linear position and angular position, respectively. The vertical axes in both figures indicate the value of the correlation in arbitrary units. The horizontal axis in FIG. 8A indicates a linear position in millimeters and the horizontal axis in FIG. 8B indicates an angular position in milliradians. Manipulating the linear position and angular orientation of the scattering waveguide relative to the incoming laser beam allowed characterization of the sensitivity of the waveguide to alignment, quantification of the size of the potential encryption key space, and consistency of the scattered light pattern to realignment and repeated measurements. To test the sensitivity of the scattered light with alignment the waveguide was shifted linearly by increments of 5 μm, and rotated about the entrance end face by increments of 0.05° (~0.87 mrad). Cross correlations of the intensity distributions showed a zero correlations at approximately 25 μm and 5 mRad respectively. Therefore, for a single incident wavelength, approximately $10^6$ uncorrelated patterns can be produced by a single 1 cm×1 cm scattering waveguide.

The sensitivity of the scattered light pattern to slight mechanical misalignment, and environmental considerations such as turbulence, may make some filtering desirable to eliminate these noise sources. In the illustrated embodiment, a one-dimensional, Gaussian wavelet multiscale filter is used for this purpose. The kernel of this filter is $$g(n,x) = C_n * \exp[-x^2/2\sigma_n^2 + i2\pi f_n x],$$

wherein
g=filter kernel to be convolved with the signal
n is an index
x=spatial coordinate
C=normalization constant
σ=standard deviation of the Gaussian envelope
f=center frequency of the filter.

The filter is used as an iterative filter, stepping in one-octave frequency steps. The standard deviation is chosen such that it provides a constant one-octave bandwidth in the frequency domain. In such a fashion pixel level noise and variations due to small misalignments are removed, allowing for repeated generation of a given random number by a given set of system parameters. Persons of ordinary skill in the art having benefit of the present disclosure should appreciate that the present invention is not limited to the one-dimensional, Gaussian wavelet multiscale filter. In alternative embodiments, any desirable filter or filtering technique may be used.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
   a light source for providing coherent light;
   a scattering waveguide for receiving the coherent light and providing scattered light, the relative position of the light source and the scattering waveguide being variable; and
   a detector for forming at least one random number based on the scattered light.

2. The apparatus of claim 1, wherein the light source comprises a laser.

3. The apparatus of claim 2, comprising at least one of an end face coupling, a grating coupling, and a prism coupling deployed between the light source and the scattering wave guide.

4. The apparatus of claim 1, wherein the scattering waveguide comprises a single-mode planar waveguide.

5. The apparatus of claim the 4, wherein the single-mode planar waveguide comprises:
   a first cladding layer;
   a first core layer formed above the first clad layer; and
   a second cladding layer formed above the first core layer.

6. The apparatus of claim 5, comprising a plurality of scattering pillars formed within the first core layer.

7. The apparatus of claim 6, wherein the scattering pillars and the first and second cladding layers are composed of the same material.

8. The apparatus of claim 6, wherein the first and second cladding layers have a selected index contrast with the core layer.

9. The apparatus of claim 7, wherein the index of refraction of the core and cladding layers may be adjusted by controlling the temperature of the waveguide.

10. The apparatus of claim 7, wherein the index of refraction of the core layer may be adjusted by changing an electric field across the waveguide.

11. The apparatus of claim 1, wherein scattering waveguide comprises a flaring waveguide with textured sidewalls.

12. The apparatus of claim 1, wherein the angle of the light entering the scattering waveguide is variable.

13. The apparatus of claim 1, wherein the relative linear position of the light source and the scattering waveguide is variable.

14. The apparatus of claim 1, comprising a plurality of kinetic optical mounts having up to six degrees of freedom of motion.

15. The apparatus of claim 1, wherein the detector comprises at least one of a CCD camera and a photodiode array.

16. The apparatus of claim 15, wherein the detector comprises an image processor for accessing information indicative of an image captured by the CCD camera or the photo diode array.

17. The apparatus of claim 16, wherein the image processor forms the random number based on the information indicative of the image captured by the CCD camera or the photo diode array.

18. A method, comprising:
selecting a relative position of a light source and a scattering waveguide;
providing coherent light to the scattering waveguide using the light source;
receiving light scattered by the scattering waveguide; and
forming a random number based on the scattered light.

19. The method of claim 18, wherein selecting the relative position comprises selecting a rotational position of the scattering waveguide.

20. The method of claim 18, wherein selecting the relative position comprises selecting a relative angular orientation of the light source and the scattering waveguide.

21. The method of claim 18, wherein selecting the relative position comprises selecting a relative angular orientation of the light source and an endface of the scattering wave guide.

22. The method of claim 18, wherein selecting the relative position comprises selecting a relative linear position of the light source and the scattering waveguide.

23. The method of claim 18, wherein providing the coherent light comprises providing the coherent light using a laser.

24. The method of claim 18, wherein receiving the coherent light comprises receiving the coherent light via at least one of an end-face coupling, a grating coupling, and a prism coupling.

25. The method of claim 18, wherein receiving the coherent light comprises receiving the coherent light using a scattering waveguide comprising a plurality of scattering pillars.

26. The method of claim 18, wherein receiving the coherent light comprises receiving the coherent light using a scattering waveguide comprising a flaring waveguide with textured sidewalls.

27. The method of claim 18, wherein receiving the coherent light comprises receiving the coherent light using at least one of a CCD camera and a photodiode array.

28. The method of claim 27, wherein forming the random number comprises accessing information indicative of an image captured by the CCD camera or the photo diode array.

29. The method of claim 28, wherein forming the random number comprises forming the random number based on the information indicative of the image captured by the CCD camera or the photo diode array.

\* \* \* \* \*